March 5, 1963 W. ODENWALD ET AL 3,080,285
MEDICATED BIRD SEED AND METHOD OF MAKING SAME
Filed Sept. 18, 1958 4 Sheets-Sheet 1

INVENTORS
WILLIAM ODENWALD
GABRIEL APPLEMAN
WALTER L. HARDY
BY
ATTORNEY

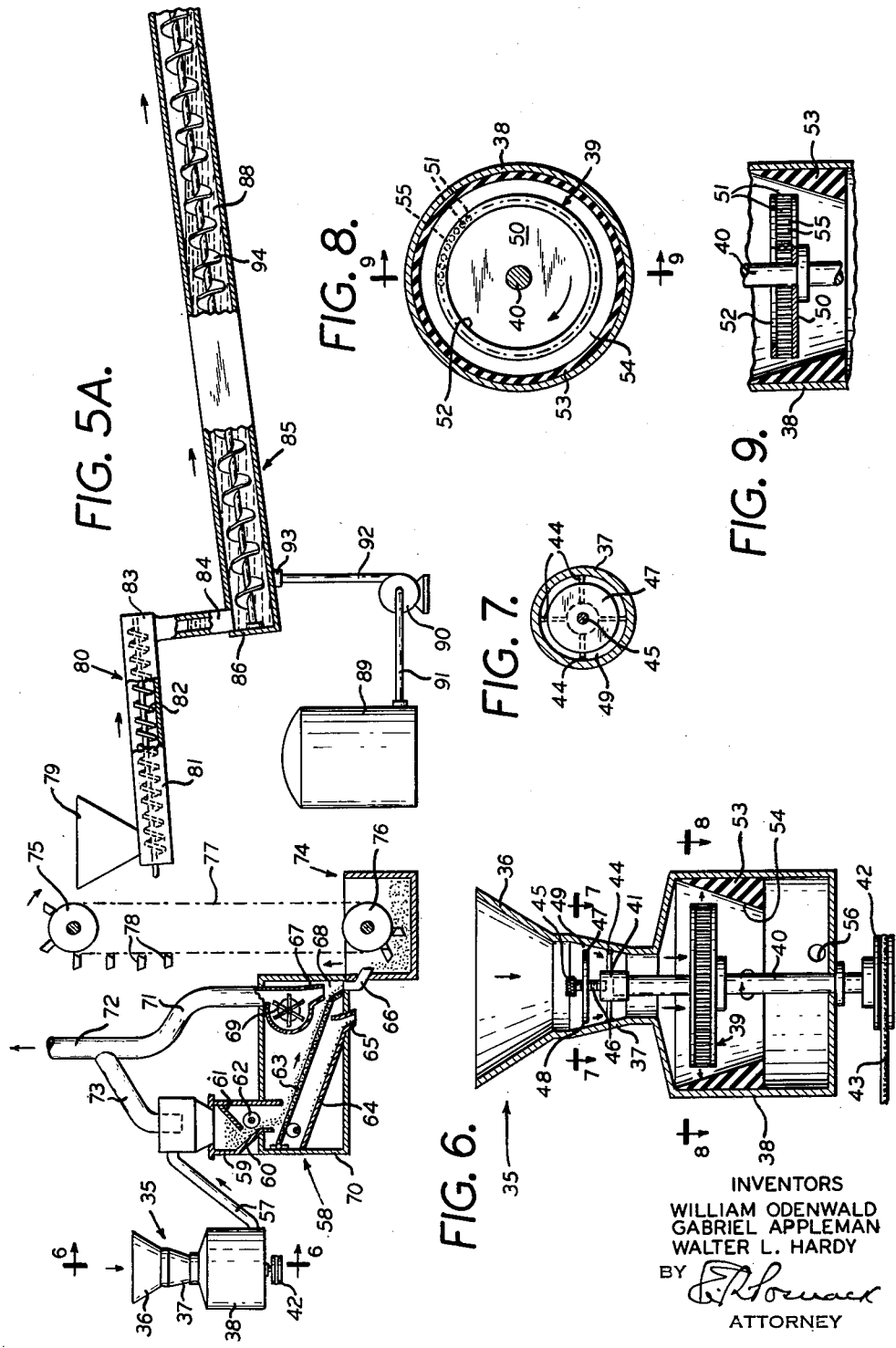

March 5, 1963 W. ODENWALD ET AL 3,080,285
MEDICATED BIRD SEED AND METHOD OF MAKING SAME
Filed Sept. 18, 1958 4 Sheets-Sheet 3
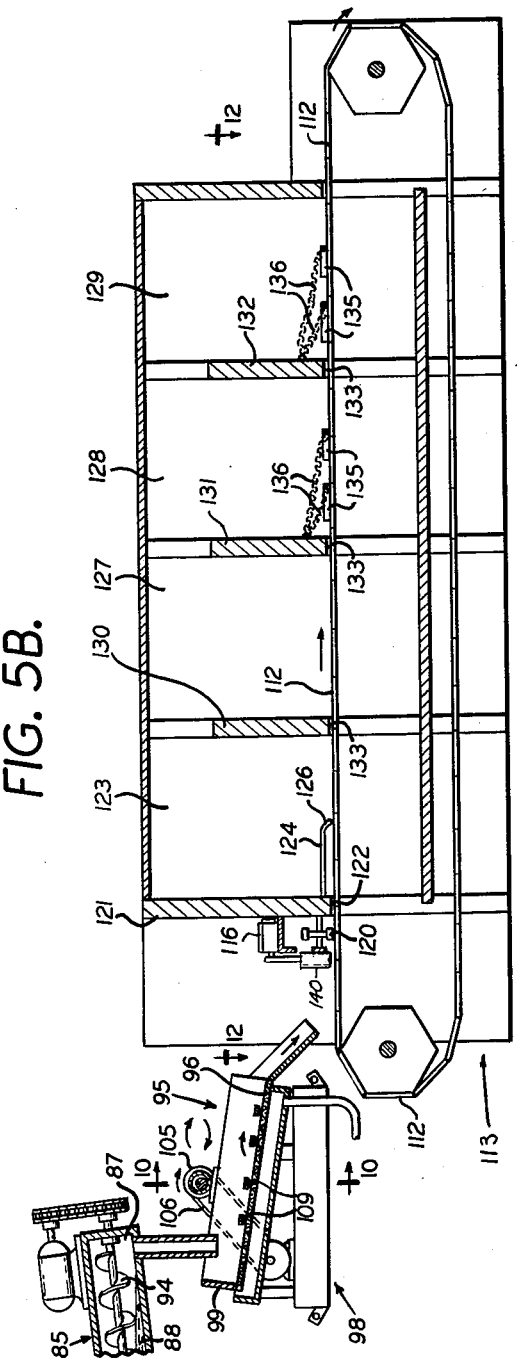
INVENTORS
WILLIAM ODENWALD
GABRIEL APPLEMAN
WALTER L. HARDY
BY
ATTORNEY

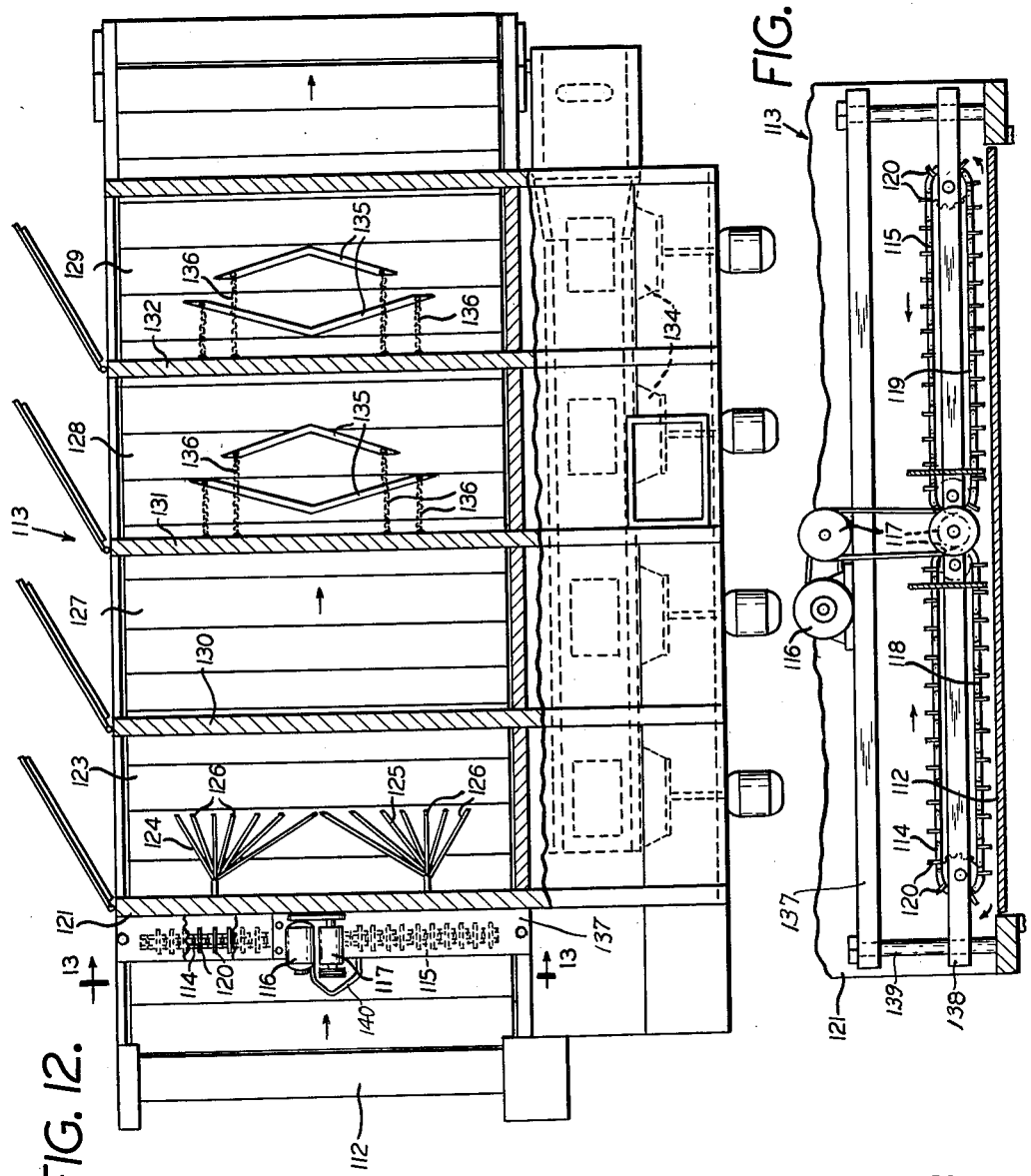

United States Patent Office 3,080,285
Patented Mar. 5, 1963

3,080,285
MEDICATED BIRD SEED AND METHOD OF MAKING SAME
William Odenwald, Elizabeth, N.J., and Gabriel Appleman, Flushing, and Walter L. Hardy, New York, N.Y., assignors to Hartz Mountain Products Corp., New York, N.Y., a corporation of Delaware
Filed Sept. 18, 1958, Ser. No. 761,819
11 Claims. (Cl. 167—53.1)

This invention relates to a medicated bird food, and a novel method and apparatus for coating the food with a selected medication, the invention being particularly directed to the combining of antibiotics with bird seed.

For maintenance of the health of certain birds, such as parakeets and other caged birds, the treatment by internal doses of aureomycin is generally indicated. To make such medications palatable it has heretofore been attempted to admix particles of dried aureomycin with millet. Such attempts have not proved successful inasmuch as the resulting product was an aggregate of crushed seeds and separate particles of dried aureomycin, and did not prove palatable to birds. It is accordingly one of our objectives to provide millet effectively coated with a selected medication, such as aureomycin, thereby eliminating the presence of independent aureomycin particles, and making the coated product palatable and medically potent. It has been found that coated seed made according to our invention, in which the coating material is chlortetracycline, is particularly effective in the treatment of respiratory diseases, infectious arthritis and bacterial enteritis, in addition to stimulating food intake and helping to maintain body weight.

In the above-referred-to aspect of our invention it is a further object to apply the medicated coating in such a manner that the finished product not only has a predetermined potency, but also possesses such physical characteristics that the coating firmly grips the millet, whereby the danger of a peeling or separation of the coating is obviated.

In connection with that aspect of our invention which relates to the production of said coated millet, it is our objective to provide a continuous millet-treating process, whereby millet will be operatively coated with a predetermined amount of the antibiotic for optimum potency, and with minimum variations in the antibiotic levels of the finished product.

Other objects, features and advantages will appear from the drawings and description hereinafter given.

Referring to the drawings.

Figure 1:
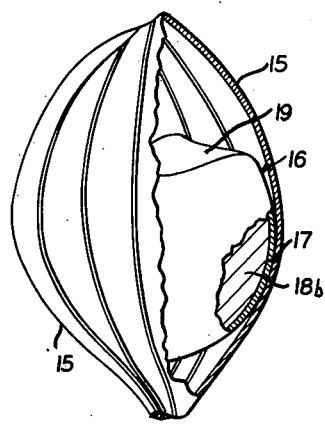
FIGURE 1 is an enlarged part-elevational and part-sectional view of an unhulled millet seed to be processed by the present invention, parts being broken away for clarity.

FIGS. 5A and 5B together constitute a schematic part-sectional, part-elevational view showing the apparatus employed in this invention.

FIG. 6 is a vertical sectional view of the hulling, shell scarifying and fragmenting device employed in this invention, the section being taken substantially along line 6—6 of FIG. 5A.

FIG. 7 is a section of FIG. 6 taken along line 7—7.
FIG. 8 is a section of FIG. 6 taken along line 8—8.
FIG. 9 is a fragmentary section of FIG. 8 taken along line 9—9.
FIG. 10 is an enlarged vertical sectional view of the dewatering screen member employed in this invention, the section being taken substantially along line 10—10 of FIG. 5B.
FIG. 11 is an enlarged fragmentary schematic view of a fragment of the dewatering screen and coacting transverse intercepting bar, showing the movement of seeds during the operative vibratory movement of the screen.
FIG. 12 is a sectional plan view of the oven apparatus and associated parts of this invention, the doors being shown in open position, the section being taken substantially along line 12—12 of FIG. 5B.
FIG. 13 is an enlarged sectional view of FIG. 12 taken substantially along line 13—13.

The millet seed employed as a bird food to which this invention is directed is characterized, in its unhulled and untreated condition, by a glume or husk constituting an outer hull within which is disposed the seed proper containing an outer glossy shell enveloping an inner core. A particular variety of millet especially adaptable for our process is known as setaria. By referring to FIGURES 1 to 4, illustrating untreated and treated millets, the outer hull is identified by the reference numeral 15, the inner seed being generally designated 16. The said inner seed comprises the outer shell or ectoderm 17, which is relatively impermeable to liquids, and the relatively soft core 18 comprising the central endoderm 18a and the body portion or mesoderm 18b. It has been found that said mesoderm 18b will absorb quantities of aureomycin solution used with our invention, as will more clearly hereinafter appear. The outer shell 17 extends to but does not cover the relatively soft endosperm 19.

Figure 2:
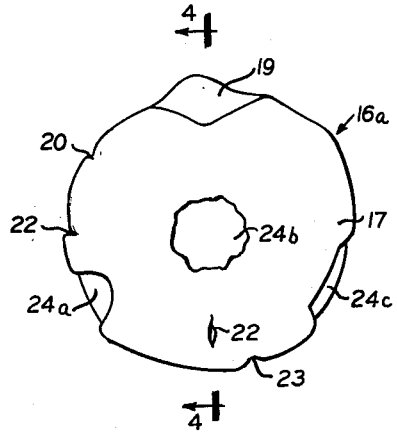
FIG. 2 is an elevational view of the inner seed after the hull had been removed and the seed subjected to shell scarifying and fragmenting steps of the process of this invention.

In producing the coated seed according to our invention, the millet is first hulled so that the outer hull 15 is removed, leaving only the inner seed 16. In carrying out this step, various means may be employed for cracking or removing the hulls 15. It is within our contemplation, however, that during the application of hulling impacts to the outer hulls 15, the force of impact be of sufficient magnitude to cause fissures in and breakage of the outer shell 17 of the inner seed 16. After the completion of this hulling and cracking process the inner seeds, having extended surfaces due to the fissures and broken hulls, are ready to receive an application of aureomycin solution, as will hereinafter be described. An exemplification of such a seed 16a is illustrated in FIG. 2 where the shell 17 is shown to contain the fissures 20, 21, 22 and 23, portions of the shell having been broken, exposing the surfaces 24a, 24b and 24c of the absorbent inner core 18.

The shell-fragmented, scarified and fissured seeds 16a are then conveyed through a solution of aureomycin along an extended and preferably upwardly inclined path, and during such movement the seeds are tumbled and agitated so that they are fully soaked with the medicated solution; and upon their operative advance, they sweep forwardly portions of the solution in their path. Because of the aforesaid upward inclination of the path, the solution carried forwardly by the advancing seeds gravitationally bear down upon such seeds, to effectively penetrate said fissures and the exposed portions of the core.

At the end of the soaking step above described, the seeds are discharged from the solution and subjected to a vibrating action—the action being upwardly and forwardly so that not only are clusters of seeds broken up, but all the seed particles are at the same time progressively advanced. During the course of such vibratory action, barriers are interposed along the path of the advancing seeds, whereby clusters will be broken up upon contact with these barriers. The vibratory action is an effective dewatering step, causing excess liquid to drain off the separated seeds and the broken clusters.

After the completion of the aforesaid vibrating and dewatering step, the seeds are deposited upon a conveyor and spread evenly thereover, the seeds being conveyed through an oven containing circulating air. During the passage of the seeds through the oven, any remaining clusters are broken up, so that maximum seed surfaces are exposed to the circulating air. The action of the oven is effective in causing an evaporation of excess liquid and a consequent drying of the seeds.

Figure 3:
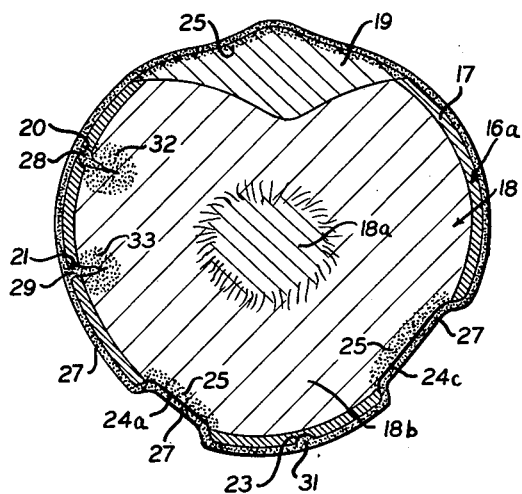
FIG. 3 is an enlarged vertical section taken centrally through the seed after the completion of the entire process, the section being taken substantially along line 3—3 of FIG. 4.
Figure 4:
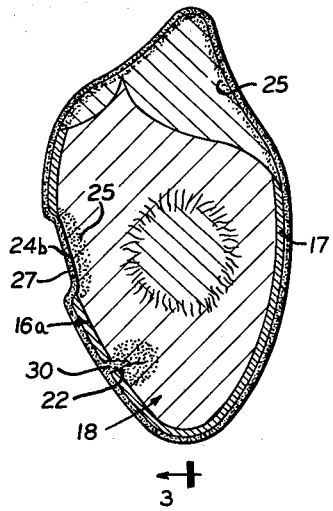
FIG. 4 is a vertical section of said completely processed seed, taken substantially along line 4—4 of FIG. 2.

We have also discovered that under the prevailing drying conditions, with an oven temperature of about 180° F., the exposed surfaces 24a, 24b and 24c of the seeds are softened by the heat and rendered tacky or mucilaginous, so that an effective union is produced between the layer of aureomycin 27 and said surfaces (FIGS. 3 and 4). The aureomycin coating with which each seed had been covered during the aforesaid treating process has fingers or branches 28, 29, 30 and 31 which extend into the aforesaid fissures, effecting a gripping action. The said branches 28, 29 and 30 which are disposed within the respective through fissures 20, 21 and 22 extend into the absorbent core 18. It has been found that, by the method of our invention, the penetration of the aureomycin into the cores through said fissures results in a spreading action, producing enlarged terminal portions 32, 33 and 34 of said respective branches 28, 29 and 30, so that when the aureomycin is fully dried by the process of our invention, such enlarged portions 32, 33 and 34 serve the function of locking members which hold the layer of aureomycin 27 against the outer surface of the seed 16a. It has also been found that the relatively soft mesoderm 18b and endosperm 19 absorb some of the aureomycin, the absorbed portions, designated by the reference numeral 25, also serving to effect a gripping action to hold the aureomycin layer 27 upon the inner seed. The aforesaid fissures 20, 21, 22 and 23 provide extended gripping surfaces for the aureomycin, thereby supplementing the gripping action of the mechanical interlocking of the inwardly extending branches 28, 29, 30 and 31 and the enlarged portions 32, 33 and 34; and, as aforesaid, the mucilaginous attachment of the antibiotic layer to the exposed surfaces 24a, 24b and 24c of the inner core 18 adds to the gripping effect.

It is thus apparent that seeds treated in the manner above described contain a layer of the desired antibiotic that will not peel off or otherwise separate from the shell or core. In addition, the absorption by the core 18 of the aureomycin entering through the fissures and exposed absorbent surfaces permit the seed to contain a much larger proportion of the antibiotic than would be possible without such fissure and partially hulled inner seed.

It has been found that a solution of aureomycin chlortetracycline hydrochloride employed in the method above described produces palatable bird seed with uniform potency characteristics.

When the above-mentioned heating and drying process is completed, the seed is deposited upon a discharge belt and then conveyed along an extended path during which the seed is cooled preparatory to packaging.

A suitable apparatus for carrying out the above-described process is illustrated in FIGS. 5A to 13. A huller and seeder, generally designated 35, contains a hopper 36 adapted to receive continuous charges of millet seed. This hopper connects with an annular wall 37 therebelow which leads into the hulling chamber 38. Disposed within said latter chamber is the centrifugal seed ejecting wheel 39 fixedly mounted on the vertical shaft 40 the upper portion of which extends into the central hub member 41 the lower portion of which is recessed to serve as a bearing for the upper terminal of said shaft 40. The bottom of said shaft is attached to the pulley 42 operated by the belt 43 connected to a motor not shown. The said hub member 41 is supported by the four arms 44 connected to the inner surface of said annular wall 37, as illustrated in FIGS. 6 and 7. Extending upwardly from the top of said hub member 41 is the stud 45 the shank 46 of which is in threaded engagement with the deflecting plate 47. It will be noted that the said annular wall 37 is of substantially conical configuration, providing a downwardly extending passageway of progressively decreasing cross-sectional area. The said deflecting plate 47 is rotatably manipulated about the said threaded shank of the stud 45 until the periphery 48 thereof is at a predetermined distance from the conical annular wall, thereby providing an annular passageway 49 through which the seeds will gradually pass downwardly into the hulling chamber.

The said wheel 39, in the particular form illustrated, comprises a flat base 50 the peripheral portion of which supports the upwardly extending rods 51 arranged in circular formation, the peripheral ring 52 being mounted upon said rods, thereby providing an upper opening 52. Secured to the upper inner surface of said hulling chamber 39 is the annular impact wall 53 made of yieldable material, such as rubber, said wall having an inner conical surface 54 enveloping said wheel 39 and in spaced relation thereto.

In employing the method of this invention, continuous batches of millet seed are charged into the hopper 36 and, after passing through the peripheral passageway 49, pass downwardly gravitationally, to be deposited upon the base 50 of wheel 39. Said wheel is caused to rotate, as aforesaid, at a predetermined speed, so that the seeds within the rotating wheel are caused to be flung outwardly, by centrifugal force, through the spaces 55 between said vertical rods and into impact engagement with the conical surface 54 of said yieldable wall 53. The force of impact is predetermined to be such as not only to cause a crushing of the outer hulls 15 but also a scarification of the shell 17 of the seed proper 16, to cause fissures and breaks therein, in the manner above described and as illustrated in FIG. 2.

The seeds and broken hulls and shells are then drawn out, by suction means to be hereinbelow described, through the outlet 56 at the bottom of the hulling chamber 38. As will be seen from FIG. 5A, a discharge duct 57 conducts the seeds and hulls and broken shells into the separating device generally designated 58. This device includes a receptacle 59 which communicates with said duct 57, so that fragmented portions of hulls 15 and shells 17 and inner seeds 16 are received thereby. Said receptacle 59 contains a chute 60 and an oppositely disposed baffle 61, there being a guiding wheel 62, connected to driving means not shown, for directing the shells and seeds downwardly on to the preforated screen 63, said screen having a mesh of predetermined proportions so as to retain thereon the inner seeds 16 and to permit smaller fragments of hulls and shells to pass therethrough to the chute 64 therebelow, the latter leading into discharge outlet 65 where said fragmented hulls and other small particles are withdrawn gravitationally, or by any other method known to those skilled in the art.

The said screen 63 is inclined so as to permit the seeds and any large hull fragments thereon to gravitationally move downwardly towards an outlet chute 66. In the particular construction illustrated, a duct 67 communicates with the discharge region 68 of the inclined screen 63, said duct communicating with the exhaust fan 69 mounted in the top portion of the casing 70 constituting part of the separating device 58. The arrangement is such that the lighter hull and shell fragments in said discharge region will be drawn up by the action of said fan into the duct 71 and the collector duct 72, the latter also being connected to a duct 73 which extends into the top of the receptacle 59 so that relatively light hull and shell fragments will also be drawn up outwardly through collector 72.

The exhaust fan 69 is operated so as to be effective in withdrawing only the lighter fragments of broken hulls and shells, whereby the heavier inner seeds 16 are continuously directed to the said chute 66 which leads into the elevator apparatus generally designated 74, the particular form thereof illustrated having upper and lower pulleys 75 and 76 upon which is mounted the continuous chain member 77 having thereon a plurality of buckets 78. The said chute 66 directs the seeds into the path of said buckets 78 as they are moving upwardly towards a discharge point, the downwardly moving buckets being positioned to scoop up any accumulations of seeds within the bottom of the elevator apparatus 74.

The dehulled seeds are carried upwardly by the said buckets 78 to the hopper 79 at the entrance of the short screw conveyor device 80. In the particular form illustrated, this contains an outer casing 81 and an internal screw member 82 which advances the seeds to the discharge end 83 of said device 80, wherefrom it is deposited, through the connecting channel 84, into the treating and tumbling trough 85. This trough is tilted upwardly from the inlet terminal 86 to the discharge end 87, and is kept filled with the treating solution 88. The supply source for such treating solution is the tank 89, there being a pump 90 connecting the discharge pipe 91 from the tank 89 to the supply pipe 92 operatively connected to the trough at 93. In the preferred arrangement illustrated, the uppermost level of the fluid is such that it will not flow out of the discharge end 87 of the trough, except by the positive sweeping action of the advancing seeds.

Disposed within the trough 85 is the screw treater conveyor 94 of conventional construction, this being immersed within the solution 88. The arrangement is such that the seeds entering inlet end 86 of the trough are carried forward by the operative rotation of the screw member 94, and are also tumbled and agitated by the action of said screw member, causing a thorough soaking of the seeds by the time they have traversed the path from the inlet portion 86 of the trough to the outlet portion 87. When the seeds reach the region of said outlet portion, they sweep the solution before them towards the outlet end 87. Due to the tilt of the trough, the portions of the solution in front of the advancing seeds bear gravitationally down upon them, whereby a further effective penetration of fluid into the fissures and absorbent portions of the seeds is effected.

The continued operative rotation of the screw member 94 causes the soaked seeds to be ejected from the outlet end 87 of the trough onto the dewatering screen member 95, causing portions of the solution to spill over and onto and through the perforated screen 96 of said screen member. The said dewatering screen member 95 is mounted upon the four springs 97 which in turn are supported by the stationary structure 98. The screen member contains the frame portion 99 which has at the upper portion thereof the two laterally opposite bearings 100 and 101 which support the opposite shaft extensions 102 and 103 of the eccentric member generally designated 104. The shaft extension 103 is connected to and supports the pulley 105 the belt 106 of which is operatively connected to a motor not shown. Disposed between the said shaft extensions 102 and 103 is the eccentrically positioned cylindrical weighted member 107, the entire eccentric member being encased within the housing 108.

The arrangement is hence such that upon an operative rotation of the pulley 105, the eccentric member 104 will be caused to rotate, the eccentrically disposed weighted portion 107 causing a vibratory action of the entire spring-mounted dewatering screen member 95.

It is to be noted that since the weighted eccentric member 107 rotates in an orbit eccentric with respect to the shaft extensions 102 and 103, the operative movement of the entire screen member 95 will follow a substantially similar orbital path. In other words, since the orbital path of said weighted member 107 is essentially upwardly, forwardly, downwardly and rearwardly, with the stroke in each direction dependent upon the eccentricity of said eccentric member, the entire dewatering screen member 95, including the screen floor 96 thereof, will also move upwardly, forwardly, downwardly and rearwardly.

Because of the orbital vibratory path above described, and the downward tilt of screen floor 96, it is evident that the individual seeds, as well as clusters of seeds, will also be thrown upwardly and forwardly during the operative vibration motion of member 95, thereby causing continuous advancing movements of said seeds. With each said movement of the seeds a drainage of the soaked seeds results—to the extent that there are exposed surfaces of the individual seeds permitting such a drainage. To enhance the dewatering action, transverse bars 109 are attached to the lateral sides 99a and 99b of the dewatering member, the bottom of each of said bars being slightly spaced above the screen floor 96 of said dewatering member. In the particular form illustrated, the said floor 96 is slightly convex in configuration, having a raised medial crown thereon. The construction is such as to provide the medial space 110 and the lateral spaces 111 between the bottom of the bars and the screen floor.

In the operation of this structure, individual seeds or clusters of seeds behind said bars are operatively thrown forwardly towards each bar (see FIG. 11), some of the seeds and clusters coming into contact with the body of the bar, other seeds being thrown over the bar, and others moving, in single layer formation, under the bar through the said spaces 110 and 111. The arrangement is such that on the screen floor in front of the bars the seeds are thinly spread out, exposing considerable areas thereof for effective drainage through the meshwork of the screen floor 96.

From the said dewatering screen 95 the partially dewatered seeds are discharged upon the slow-moving belt 112 which leads into the oven 113, to be hereinbelow described. Positioned above the oven belt 112, and extending laterally outwardly from substantially the central portion thereof, are the two transverse continuous belts 114 and 115, these belts being operated through the motor 116 and transmission mechanism generally designated 117. In the embodiment illustrated, the motor and part of the transmission mechanism are shown supported upon the platform 137, the transverse belts 114 and 115 being rotatably connected to the horizontal supporting structure generally designated 138—both members 137 and 138 being mounted on the posts 139. The particular constructions of the belts 114 and 115, the transmission mechanism 117, and the members 137, 138 and 139 are not shown, since they are known to those skilled in the art, and further since a description thereof is not necessary for an understanding of the present invention.

The operative movements of said transverse belts 114 and 115 are such that the respective lower portions 118 and 119 thereof, spaced above the belt 112, are in opposite laterally opposite directions. Said transverse belts carry thereon seed-sweeping members 120, the lower terminals of which are spaced sufficiently above the belt 112 to cause an engagement thereof with seeds being conveyed towards the oven 113, such engagement being effective in causing a lateral spreading of said seeds on the belt 112. It will be noted that the seeds approaching the belts 114 and 115 are diverted laterally by the medially disposed guard member 140. The seeds are operatively moved towards the rear wall 121 of the oven, the bottom edge 122 of said wall being spaced slightly above the conveyor belts 112 to permit a thin layer of seed to move under the wall and into the first chamber 123 of the heating unit 113.

Disposed forwardly of the said rear wall 121 of the oven are the two laterally spaced rakes 124 and 125, the tines 126 thereof serving to break up any remaining clusters of seeds that are conveyed by belt 112, thereby separating the seeds to expose as much as possible of their surfaces to the drying action of the circulating air within the oven. There are three other oven compartments 127, 128 and 129 separated by the respective walls 130, 131 and 132, the bottoms 133 of each of these walls being slightly spaced above the conveyor belt 112 so as to permit the entry of only a thin layer of seed exposed to the drying atmosphere.

In the form above illustrated, there are the blowers 134 which, in well-known manner, supply the drying air for the seeds advancing forwardly within the oven. The oven heating means are not shown, since they are well-known to those skilled in the art.

To expose the seeds individually to maximum drying effects of the circulating heated air within the oven, a plurality of bars 135, preferably of V-shaped formation as illustrated, rest transversely upon the moving belt 112, these being attached to chains 136 which are themselves anchored to the walls of the oven. The arrangement is such that as the belt carries the seed forwardly, they will engage and climb over these bars, or be distributed laterally thereby, some seeds actually moving under the slightly vibrating bars—the said bars creating a tumbling and dispersing action of the seeds, thereby effectively exposing them to the action of the drying air. It is evident that the bars are maintained in slight motion by the movement of the conveyor belt 112, such motion being sufficient to aid in the said tumbling action and in the breaking up of seed clusters in the manner described. It is noteworthy that since the bars are not firmly secured in place, their action is yieldable with respect to any seeds that happen to pass underneath them, whereby the danger of a crushing or mutilation of the seeds is obviated.

As hereinabove stated, it has been found that under the heating action of the oven, the exposed surfaces of the inner core of the seed—like surfaces 24a, 24b and 24c shown in FIG. 2—become sufficiently softened to cause a mucilaginous adhesion of such surfaces with the dried coating 27. Such adhesion is particularly effective when the antibiotic treating solution employed in the process is a concentration of aureomycin chlortetracycline hydrochloride such as to produce a potency of between .30 and .50 milligram of aureomycin per gram of seed.

After the dried and heated seeds pass compartment 129 of the oven, they are discharged upon a discharge belt (not shown) which conveys them to a cooling belt for transmission to suitable packaging apparatus. The cooling and packaging mechanisms are not herein described, since they may be of any construction well-known to those skilled in the art.

By the specific apparatus above described, there is effected a continuous hulling, shell fragmentation, abrading and cracking action of the seeds, a soaking of the seeds, then dewatering, drying and cooling thereof to create a final permanently coated product of uniform potency.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. A medically treated seed with an inner core previous to liquids and an outer shell about said core, said outer shell having an apertured portion therein exposing the outer surface of said inner core, and a dried layer of antibiotic material on said shell and over said exposed surface and extending therethrough into said core, whereby the portion of said antibiotic material disposed within said core is interengaged therewith to hold said layer on said shell.

2. A medically treated seed with an inner core pervious to liquids and an outer shell about said core, said outer shell having fissures extending inwardly from the outer surface of the shell to said core, and a dried layer of antibiotic material on said shell and having branches extending through said fissures and into said core, the innermost terminals of said branches being enlarged and being entirely disposed within and interlocked with said core, whereby said layer is maintained upon said shell.

3. A medically treated seed with an inner core and an outer shell about said core, said outer shell having apertured portions therein exposing portions of the outer surface of said inner core, and a dried layer of antibiotic material over the seed, a portion of said layer being disposed over said shell and other portions thereof being adhesively secured to said exposed portions of said inner core.

4. A medically treated seed with an inner core pervious to liquids and an outer shell about said core, said outer shell having an apertured portion therein exposing the outer surface of said inner core, and a coating of antibiotic material comprising a dried layer of a solution of aureomycin chlortetracycline hydrochloride on said shell and over said exposed surface and extending therethrough into said core, whereby the portion of said antibiotic material disposed within said core is interengaged therewith to hold said layer on said shell.

5. In a method of treating bird seed of the type having an outer hull and an inner seed comprising a liquid-pervious core encased within a shell, the steps of removing said outer hull, scarifying and cracking said shell to produce apertures therein extending at least to the outer surface of said core, soaking said seed in a solution of antibiotic material, whereby said solution will be deposited upon said shell and enter said apertures to be absorbed within said core, dewatering and drying said seed to produce a dried antibiotic coating on the shell with dried portions of said antibotic material extending from said coating into and interengaged with said core.

6. In a method of medically treating bird seed of the type having an outer hull and an inner seed comprising a liquid-pervious core encased within a shell, the steps of removing said outer hull, scarifying and cracking said shell to produce apertures therein extending at least to the outer surface of said core, soaking said seed in a solution of aureomycin chlortetracycline hydrochloride, whereby said solution will be deposited upon said shell and enter said apertures to be absorbed within said core, dewatering and drying said seed to produce a dried antibiotic coating on the shell with dried portions of said antibiotic material extending from said coating into and interengaged with said core.

7. In a method of medically treating bird seed of the type having an outer hull and an inner seed comprising a liquid-pervious core encased within a shell, the steps of removing said outer hull, cracking said seed to produce fissures therein extending from the outer surface of said shell to the interior of said core, removing portions of said shell to expose portions of the outer surface of said core, soaking said seed in a solution of aureomycin chlortetracycline hydrochloride, whereby said solution will be deposited upon said shell and upon said exposed portions of said core and enter said fissures to be absorbed within the core, dewatering said seed and then heating same to produce a dried antibiotic coating on the shell and over said exposed surfaces of the core with dried portions of said antibiotic material extending from said coating into and interengaged with said core.

8. In a method of treating bird seed, the steps according to claim 7, said step of heating the seed comprising subjecting it to a temperature sufficiently high to produce a mucilaginous adhesion between said exposed portions of said core and the dried coating thereover.

9. In a method of treating bird seed, the steps according to claim 7, said step of heating the seed comprising subjecting it to a temperature within a range of 170° F. to 180° F., to produce a mucilaginous adhesion between said exposed portions of said core and the dried coating thereover.

10. In a method of medically treating a supply of bird seed of the type having an outer hull and an inner seed comprising a liquid-pervious core encased within a shell, the steps of removing said outer hulls, scarifying and cracking said shells to produce apertures therein extending at least to the outer surface of said cores, separating said removed hulls from said seeds, conveying said seeds through an aureomycin solution along an upwardly inclined path and simultaneously agitating said conveyed seeds, whereby said solution will be deposited upon said shells and enter said apertures to be absorbed within said cores, vibrating said seeds and simultaneously moving them forwardly whereby said seeds will be partially dewatered, and heating and drying said seeds so as to produce dried antibiotic coatings on the shells with dried portions of said antibiotic material extending from said respective coatings into and interengaged with the respective cores of said seeds.

11. In a method of medically treating bird seed of the type having an outer hull and an inner seed comprising a liquid-pervious core encased within a shell, the steps of hurling a supply of said seeds against an impact surface with sufficient force to cause a separation of said hulls from the seeds and a scarification and cracking of said shells to produce apertures therein extending at least to the outer surface of said cores, separating said removed hulls from said seeds, conveying said seeds through an aureomycin solution along an upwardly inclined path, whereby said solution will be deposited upon said shells and enter said apertures to be absorbed within said cores, vibrating said seeds and simultaneously moving them forwardly whereby said seeds will be partially dewatered, conveying said partially dewatered seeds forwardly and simultaneously spreading them into a relatively thin layer, and simultaneously heating and drying said layer of seeds so as to produce dried antibiotic coatings on the shells and dried portions of said antibiotic material extending from said respective coatings into and interengaged with the respective cores of said seeds.

References Cited in the file of this patent

UNITED STATES PATENTS

| | | |
|---|---|---|
| 1,756,488 | Kellogg | Apr. 29, 1930 |
| 1,756,497 | Warren | Apr. 29, 1930 |
| 1,846,510 | Busse | Feb. 23, 1932 |
| 2,720,727 | Pidacks | Oct. 18, 1955 |
| 2,762,288 | Guerrero | Sept. 11, 1956 |
| 2,787,208 | Russell | Apr. 2, 1957 |
| 2,881,112 | Mattox | Apr. 7, 1959 |
| 2,885,321 | Hollis | May 5, 1959 |
| 2,946,685 | Ross | July 26, 1960 |

OTHER REFERENCES

Drug Trade News, Jan. 30, 1956, pp. 35 and 49.
Jolly Keet, TM file, 653,867, Oct. 29, 1957.